United States Patent
Grass

(10) Patent No.: US 6,703,732 B2
(45) Date of Patent: Mar. 9, 2004

(54) ELECTROMOTOR, ESPECIALLY WIPER MOTOR, WIPING THE GLASS SURFACE OF A MOTOR VEHICLE

(75) Inventor: Ansgar Grass, Schutterwald-Langhurst (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,402

(22) PCT Filed: Dec. 20, 2000

(86) PCT No.: PCT/DE00/04552

§ 371 (c)(1),
(2), (4) Date: Apr. 1, 2002

(87) PCT Pub. No.: WO01/72563

PCT Pub. Date: Oct. 4, 2001

(65) Prior Publication Data

US 2002/0121820 A1 Sep. 5, 2002

(30) Foreign Application Priority Data

Mar. 24, 2000 (DE) .......................... 100 14 735

(51) Int. Cl.[7] .......................... H02K 7/116; B60S 1/16
(52) U.S. Cl. ............ 310/75 R; 310/68 B; 310/DIG. 6; 74/89.14
(58) Field of Search .............. 310/68 B, 75 R, 310/80, DIG. 6; 74/89.14, 425

(56) References Cited

U.S. PATENT DOCUMENTS

| | | | |
|---|---|---|---|
| 5,566,577 A | * | 10/1996 | Klar .............................. 74/42 |
| 5,855,140 A | * | 1/1999 | Imamura ....................... 74/42 |
| 5,917,298 A | * | 6/1999 | Miller ......................... 318/444 |
| 5,929,588 A | | 7/1999 | Shiah ......................... 318/653 |
| 6,111,378 A | * | 8/2000 | LeMay et al. ............... 318/443 |

FOREIGN PATENT DOCUMENTS

| | | |
|---|---|---|
| DE | 37 30 900 | 3/1989 |
| DE | 40 39 038 | 6/1992 |
| DE | 43 24 621 | 1/1995 |
| WO | WO 98 07601 | 2/1998 |
| WO | WO 99 00885 | 1/1999 |

* cited by examiner

*Primary Examiner*—Burton Mullins
(74) *Attorney, Agent, or Firm*—Kenyon & Kenyon

(57) ABSTRACT

An electric motor, in particular a wiper motor, for wiping a window of a motor vehicle, having a gearing situated in a gear housing, a cover closing the gear housing, and a control electronics having a sensor device, which detects the position of the gearing and records the signals of a signal transmitter situated at or in a movable part of the gearing, elements of the sensor device being situated in the cover or at least on the side of the gearing facing the cover and determining the position of the gearing without contact.

17 Claims, 2 Drawing Sheets

ELECTROMOTOR, ESPECIALLY WIPER MOTOR, WIPING THE GLASS SURFACE OF A MOTOR VEHICLE

FIELD OF THE INVENTION

BACKGROUND INFORMATION

The present invention relates to an electric motor, in particular a wiper motor, for wiping a rear window of a motor vehicle.

BACKGROUND INFORMATION

Numerous electric motors as wiper motors are already known. In the case of these electric motors, the armature shaft of the electric motor has, at one end, a gearing having a worm gear that drives a large worm gear. Situated at this worm gear is a conversion gearing that converts the rotating motion of the gear wheel into a pendulum motion of a wiper shaft. A transmitter magnet is situated on the side of the worm gear opposite the conversion gearing. A Hall-effect sensor connected to an electronics reads off the position, in particular the park position, of the wiper motor. The arrangement on the side opposite the conversion gearing is necessary since the transmitter magnet must move away at a very close distance under the Hall-effect sensor in order to ensure reliable park position detection.

In this context, it is problematic that in the manufacturing sequence, the motor must be turned over once since the conversion gearing and gear cover must be assembled on one side, and the plastic housing, including the printed circuit board and Hall-effect sensor, must be assembled from the opposite back side.

SUMMARY OF THE INVENTION

The electric motor according to the present invention has the advantage that as a result of the one-sided arrangement of the gear elements, the sensor device, the signal transmitter, and the printed circuit board, the turning of the electric motor during the manufacturing sequence is eliminated without reducing the reliability of the park position detection, thereby resulting in significant simplification and savings. Thus, the gear housing can be fitted on one side with the worm wheel, the conversion gearing, and the sensor device.

It is particularly advantageous when the sensor device has at least one Hall-effect sensor and the signal transmitter at least one transmitter magnet. Hall-effect sensors and transmitter magnets are available as inexpensive production goods of uniform quality.

A further advantage results when the signal transmitter and the conversion gearing are situated on the same side of the worm gear, thereby ensuring quick assembly and the best possible accessibility in the case of repairs.

The electrical leads of the sensor device being formed in such a manner that the distance between the signal transmitter and the sensor device is minimal results in a further advantage since the sensor device can reliably detect as a result of the minimal distance and no further holding devices are needed for the sensor device due to the forming of the leads.

In particular, it is advantageous to form a flexible printed circuit board in such a manner that the distance between the signal transmitter and the sensor device is minimal. In this manner, optimum signal quality is ensured, a flexible printed circuit board allowing in turn that no further holding elements are needed for the sensor device.

If the sensor device is supported by a plastic part produced using spatial injection-molding, circuit-carrier technology (MID), no further holding elements are necessary for the sensor device, especially when the plastic part is also used as a cover.

If the gearing further has a neutral position in which the distance between the conversion gearing and the signal transmitter is at a maximum, the magnetic flux of the transmitter magnet is not short-circuited by the magnetic material of the conversion gearing, thereby also preventing remanence occurrences in the conversion gearing.

In particular, it is advantageous when, in a park position corresponding to the neutral position, the distance between the signal transmitter and the sensor device is at a minimum. This is then the case when the transmitter magnet comes to rest under the Hall-effect sensor, so that it emits a switching signal (LOW-level) when the park position is reached.

Furthermore, it is advantageous to manufacture the conversion gearing from a non-magnetic material since remanence occurrences can be completely ruled out in this manner. In particular, the transmitter magnet in the neutral position can, therefore, also be situated in the region of the conversion gearing in this case.

DETAILED DESCRIPTION

Figure 1:
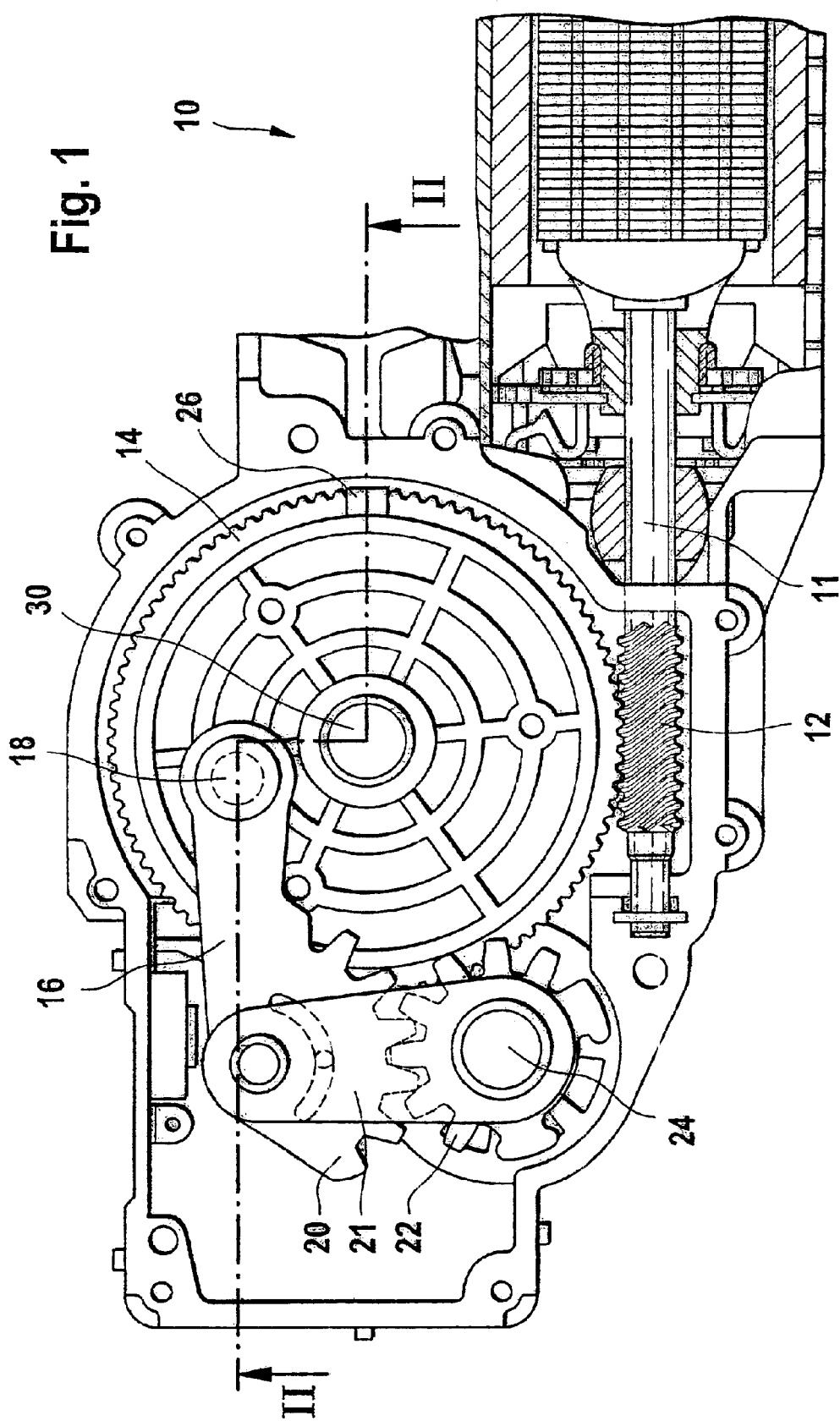
FIG. 1 shows a section of an electric motor according to the present invention.

FIG. 1 represents a top view of a section of electric motor 10 according to the present invention. An armature shaft 11 carries a worm 12, which drives a worm gear 14. A connecting rod 16 is joined at one end in a rotatably fixed manner to a joint pin 18, which eccentrically engages with a cut-out 19 (FIG. 2) at worm gear 14. At the other end, connecting rod 16 has a toothed sector 20 as part of a gear wheel. The center of this toothed sector 20 is rotatably joined via a bar 21 to a wiper shaft 24, which is then linked in a rotatably fixed manner to a pinion 22, namely such that toothed sector 20 and pinion 22 are engaged.

Through a rotary motion of armature shaft 11, worm gear 14 is driven via worm 12. Connecting rod 16 consequently moves, driving pinion 22 via its toothed section 20.

Connecting rod 16, joint pin 18, and bar 21 thus jointly form a conversion gearing that coverts the crank-like motion of connecting rod 16 into a pendulum movement of wiper shaft 24.

Also attached on the side of worm gear 14 on which joint pin 18 and connecting rod 16 are situated is a transmitter magnet 26. This transmitter magnet is inserted or integrated in worm gear 14 such that it does not hinder the movement of the conversion gearing, in particular it moves away in response to every movement under connecting rod 16.

Figure 2:
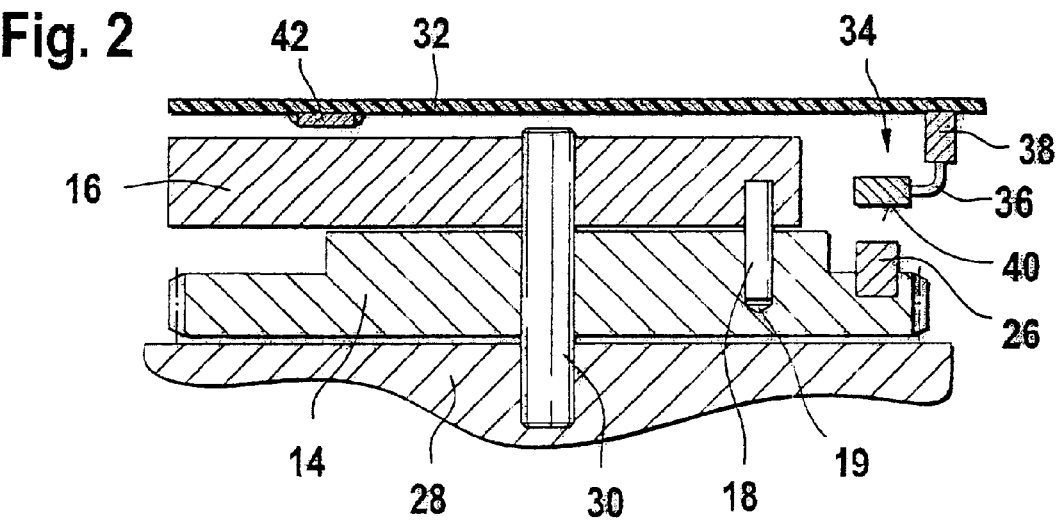
FIG. 2 shows a schematic representation of a section along line II—II in FIG. 1.

Gear housing 28 represented in FIG. 2 has a housing pin 30, which is joined in a rotatably fixed manner to gear housing 28 and supports worm gear 14. Joint pin 18 is seated in a cut-out 19 in worm wheel 14 and is rotationally mounted therein. Joint pin 18 is joined in a rotatably fixed manner to connecting rod 16 of the conversion gearing, yet the reverse is also possible in which case joint pin 18 is attached in a rotatably fixed manner to worm gear 14 and rotatably attached to connecting rod 16.

Situated at the edge of worm gear 14 is a transmitter magnet 26, which is used as a signal transmitter. A printed circuit board 32, which is situated in the cover of gear housing 28, has a power electronics for controlling electric motor 10.

For detecting the park position of electric motor 10, a wired Hall-effect sensor is situated at printed circuit board 32, as sensor device 34, which receives the signals of transmitter magnet 26.

To reliably detect the park position, Hall-effect sensor 34 is situated as closely to transmitter magnet 26 as possible and at the same time not extend into the motion space of the conversion gearing. Typically, a distance of about 2 mm is selected between Hall-effect sensor 34 and transmitter magnet 26 since, in the case of significantly smaller distances, the danger of damage cannot be ruled out in the event of vibrations. However, this danger can be reduced with suitable construction and material selection.

Hall-effect sensor 34 is soldered to printed circuit board 32 and projects via its connecting wires 36 into the space not tangent to the conversion gearing. Connecting wires 36 are bent in such a manner that the distance between transmitter magnet 26 as the signal transmitter and Hall-effect sensor 34 as the sensor device is minimal. It is not necessary to specially mention that functionless intermediate pieces 38, for example, can also be used as an extension of connecting wires 36. The actual Hall-effect element is poured into a small housing, and connecting wires 36 of the Hall-effect sensor are angled in such a manner that active Hall-effect sensor surface 40 is parallel to the transmitter magnet. Situated on printed circuit board 32 are typically additional components 42, which, in particular, can also be designed using SMD technology.

Figure 3:
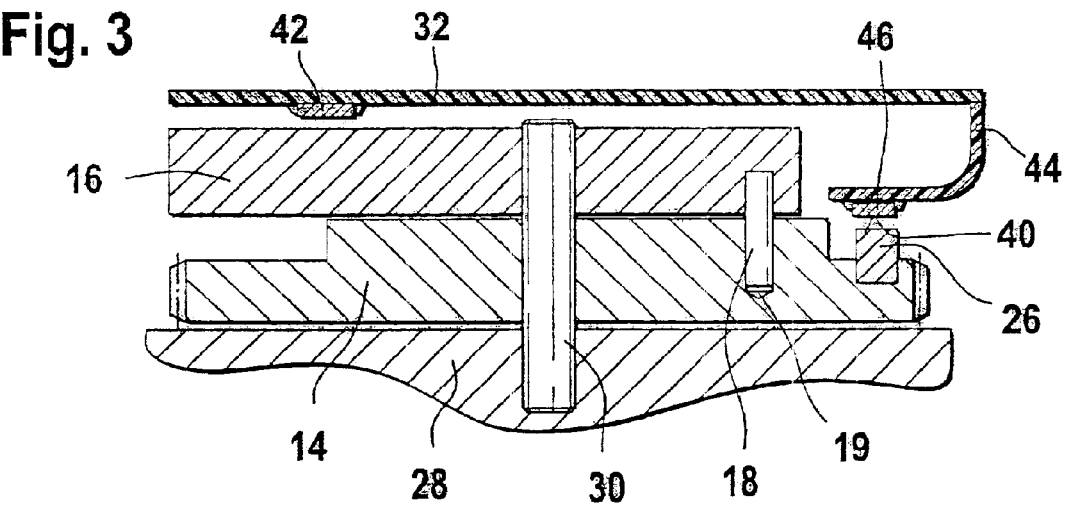
FIG. 3 shows a section corresponding to FIG. 2 of a second exemplary embodiment.

FIG. 3 shows the same section as FIG. 2, yet in a variation of the exemplary embodiment. A gear housing 28 has a housing pin 30, which is situated in a rotatably fixed manner in gear housing 28 and supports worm gear 14.

Printed circuit board 32, to which a flexible printed circuit board 44 is added at one end, is situated above connecting rod 16. This flexible printed circuit board 44 supports a Hall-effect sensor 46, which is produced using SMD technology, in particular.

Flexible printed circuit board 44 projects almost vertically from printed circuit board 32 and has an especially right-angled bend that leads active sensor surface 40 of SMD Hall-effect sensor 46 close enough to transmitter magnet 26.

However, it is also possible to produce the entire printed circuit board 32 from a flexible material and to bend it in such a manner that the necessary distance between transmitter magnet 26 and Hall-effect sensor 34 is achieved.

In the exemplary embodiment represented in FIG. 2 as well as in FIG. 3, the cover of the gearing is situated over printed circuit board 32 and, thus, over the conversion gearing.

Figure 4:
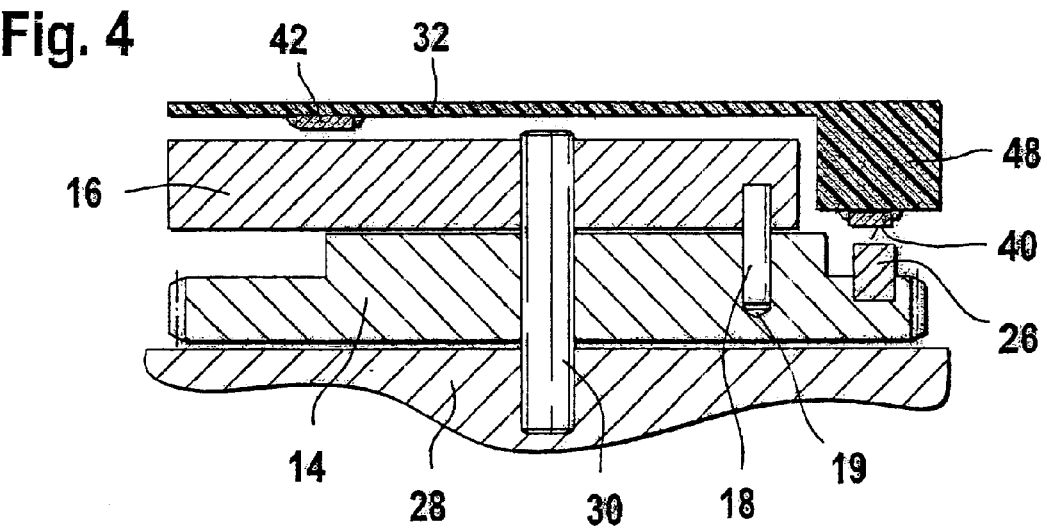
FIG. 4 shows a section corresponding to FIG. 2 of a third exemplary embodiment.

FIG. 4, on the other hand, shows a section as in FIG. 2, yet in a further variation of the exemplary embodiment. Gear housing 28 then has a housing pin 30, which is attached therein in a rotatably fixed manner, and which supports worm gear 14. Joint pin 18 is joined in a rotatably fixed manner to connecting rod 16 and is inserted into worm gear 14.

The cover of gear housing 28 has a projection 48 on which Hall-effect sensor 34, which is especially produced using SMD technology, is situated.

In this instance, printed circuit board 32 is produced using MID technology (molded interconnect device) and is at the same time used as the plastic cover for gear housing 28. The principal feature of the MID technology is the use of injection-molded parts of thermoplastic plastics as the substrate for the construction of electronic circuits. Thus, it is particularly possible to give the printed circuit board any desired shape and, therefore, also to arrange Hall-effect sensor 34 on a different level than additional components 42 of the control electronics. Conversely, it can, therefore, also be said that the cover of the gearing is situated over the conversion gear and is used as printed circuit board 32.

What is claimed is:

1. An electric motor for wiping a window of a motor vehicle, comprises:

a gear housing;

a cover for closing housing;

a gearing situated in the gear housing and including a worm gear;

a signal transmitter connected to the worm gear; and control electronics including a senor device for detecting a position of the gearing and for recording a signal of the transmitter, wherein:

the sensor device determines a position of the worm gear without contacting the worm gear, an elements of the sensor device is situated at least one of: i) in the cover, or ii) between the worm gear and the cover; and the gearing further includes an armature shaft including a worm for driving the worm gear and including a conversion gearing that is situated on the worm gear and converts a rotation of the worm gear into a pendulum motion of a wiper shaft, the signal transmitter and the conversion gearing being situated on the same side of the worm gear.

2. The electric motor according to claim 1, wherein:

the electric motor corresponds to a wiper motor.

3. The electric motor according to claim 1, wherein:

the sensor device includes at least one Hall-effect sensor, and the signal transmitter has at least one transmitter magnet.

4. The electric motor according to claims 1, wherein:

electrical leads of the sensor device are formed in such a manner that a distance between the signal transmitter and the sensor device is minimal and is less than 2.5 mm.

5. The electric motor according to claim 1, wherein:

electrical leads of the sensor device are formed in such a manner that a distance between signal transmitter and the sensor device is minimal and is less than or equal to 2 mm.

6. The electric motor according to claim 1, further comprising:

a flexible printed circuit board arranged with respect to the signal transmitter, the flexible printed circuit board being formed in such a manner that a distance between the signal transmitter and the sensor device is minimal and is less than 2.5 mm.

7. The electric motor according to claim 1, further comprising:
 a flexible printed circuit board arranged with respect to the signal transmitter, the flexible printed circuit board being formed in such a manner that a distance between the signal transmitter and the sensor device is minimal and is less than or equal to 2 mm.

8. The electric motor according to claim 1, wherein:
 the cover supports at least the sensor device and is produced in accordance with a spatial injection-molding,circuit-carrier technology, the cover being formed in such a manner that a distance between the signal transmitter and the sensor device is equal to 2.5 mm.

9. The electric motor according to claim 1, wherein:
 the cover supports at least the sensor device and is produced in accordance with a spatial injection-molding, circuit-carrier technology, the cover being formed in such a manner that a distance between the signal transmitter and the sensor device is minimal and is less than or equal to 2 mm.

10. The electric motor according to claim 1, wherein:
 the gearing has a neutral position in which a distance between the conversion gearing and the signal transmitter is at a maximum.

11. The electric motor according to claim 10, wherein:
 the neutral position corresponds to a park position.

12. The electric motor according to claim 1, wherein:
 the gearing has a neutral position in which a distance between the signal transmitter and the sensor device is at a minimum.

13. The electric motor according to claim 12, wherein:
 the neutral position corresponds to a park position.

14. The electric motor according to claim 1, wherein:
 the conversion gearing includes a non-magnetic material.

15. The electric motor according to claim 1, wherein:
 the sensor device lies over the conversion gearing on the same side as the signal transmitter and comprises leads which project away from the cover towards the conversion gearing.

16. The electric motor according to claim 1, wherein:
 the control electronics comprises a printed circuit board which lies over the conversion gearing on the same side as the signal transmitter, said printed circuit board at least partially comprises a flexible printed circuit board portion projecting away from the cover towards the conversion gearing and having the sensor device connected to it.

17. The electric motor according to claim 1, wherein:
 the cover is a printed circuit board situated over the conversion gearing and supporting the sensor device.

* * * * *